Oct. 15, 1968  R. B. ANNAT  3,405,928
DRAFT CONTROL AUXILIARY LEAF SPRING
Filed April 7, 1966  3 Sheets-Sheet 1
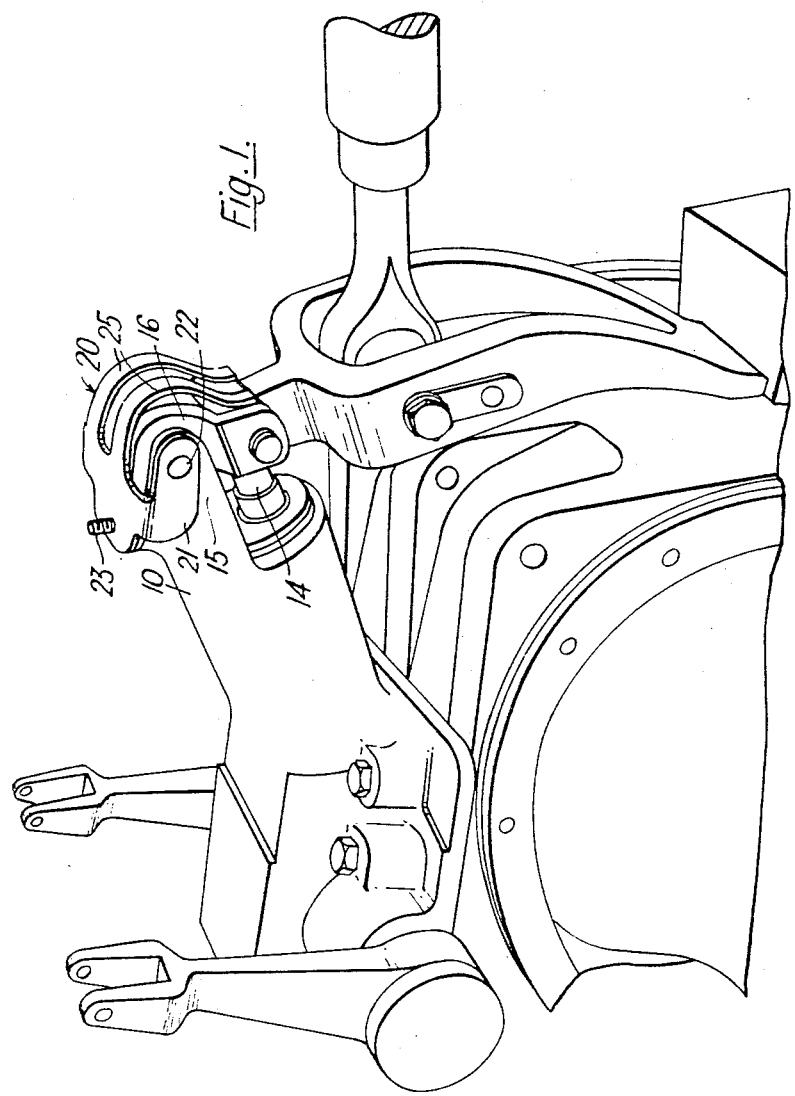
Inventor
ROBERT B. ANNAT
By Tweedale & Gerhardt
Attorneys.

Oct. 15, 1968  R. B. ANNAT  3,405,928
DRAFT CONTROL AUXILIARY LEAF SPRING
Filed April 7, 1966  3 Sheets-Sheet 2

Inventor
ROBERT B. ANNAT
By Tweedale & Gerhardt
Attorneys.

Inventor
ROBERT B. ANNAT
By Tweedale & Gerhardt
Attorneys

United States Patent Office 3,405,928
Patented Oct. 15, 1968

3,405,928
DRAFT CONTROL AUXILIARY LEAF SPRING
Robert B. Annat, Kenilworth, England, assignor to Massey-Ferguson Services N.V., Curacao, Netherlands Antilles
Filed Apr. 7, 1966, Ser. No. 540,877
Claims priority, application Great Britain, Apr. 20, 1965, 16,460/65
3 Claims. (Cl. 267—1)

ABSTRACT OF THE DISCLOSURE

An attachment means to a tractor for resiliently engaging the feedback control spring in the tractor. Such engagement either transfers the control spring from a double-acting into a single-acting spring or applies a precompression force to the control spring.

---

Tractors having a hydraulic power lift and a feedback control system such as draft control, which is operative on the power lift through a control spring, are well known. The control spring may be "single-acting" or "double-acting."

With a "single-acting" control spring, the feedback control system is operated only when the control spring is compressed and hence if a tension force is applied, the control system will be inoperative. This disadvantage is overcome by using a "double-acting" control spring which is arranged to operate the control system both under tension and compression. Application of a precompression force to a single-acting control spring effectively converts it to a double-acting control spring and it is an object of the present invention to enable this to be achieved in a simple and effective manner.

Also, in certain circumstances when a "double-acting" control spring is used, such as when very heavy implements are carried by the tractor power lift, it becomes necessary to apply a precompression force to the control spring to ensure effective operation of the feedback control system, and it is therefore a further object of the present invention to provide a simple and effective attachment by means of which such a compression force may be applied to the control spring.

The invention is a control-spring compressing attachment for a tractor comprising a leaf spring having attachment means for connecting the leaf spring to a tractor so that a portion of the leaf spring imposes a force on the control spring, and adjustment means adapted to react between the leaf spring and a reaction point on the tractor to regulate the force imposed on said control spring by said portion of the leaf spring.

Preferably said attachment means is adapted to pivotally connect the leaf spring to the tractor intermediate the ends of the leaf spring, said pressure-exerting portion of the leaf spring and said adjustment means being disposed on opposite sides of said attachment means.

The adjustment means may be a screw-threaded member carried by said leaf spring and having a head adapted to react on the tractor.

An embodiment of the invention will now be described, by way of example only, with reference to the accompanying drawings, in which:

FIG. 1 is a perspective view of the rear portion of a tractor incorporating a control-spring compressing attachment according to the invention;

Figure 3:
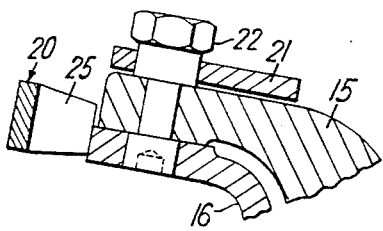
FIG. 3 is a section on the line 3—3 of FIG. 2.
Figure 2:
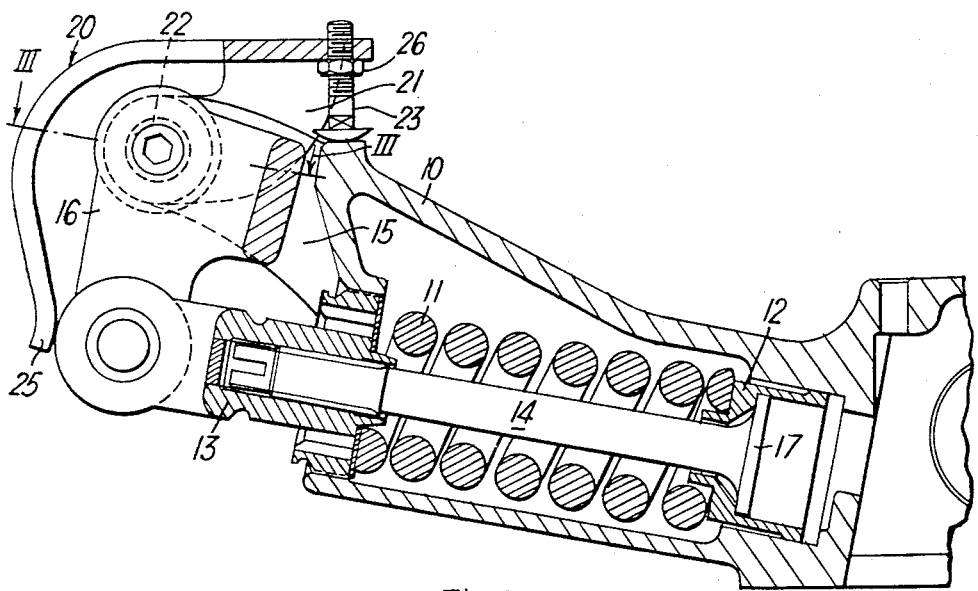
FIG. 2 is a fragmentary cross-section through the rear portion of the tractor shown in FIG. 1.
Figure 4:
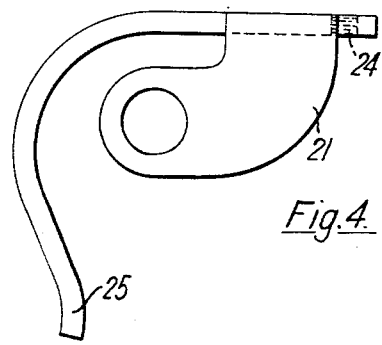
FIGS. 4 to 6 show the control-spring compressing attachment removed from the tractor.

Referring to the drawings, the numeral 10 indicates the upper rear housing of a tractor in which a control spring 11 is housed. The control spring is "double-acting" and reacts between sleeves 12 and 13 (FIG. 2), the latter sleeve being connected to a rod 14, one end of which projects out of the rear of the housing 10 and is pivotally connected to a rear extension 15 of the housing by a rocker 16. The point of pivotal connection between the rod 14 and the rocker 16 also serves for connection of the top or control link of the tractor hitch linkage through which tension or compression forces are transmitted to the rod 14 from an implement carried by the tractor hitch linkage. The other end of the rod 14 carries a head 17 which engages a control linkage (not shown) connected to the tractor hydraulic system and hence to the hitch linkage through the tractor power lift.

Figure 5:
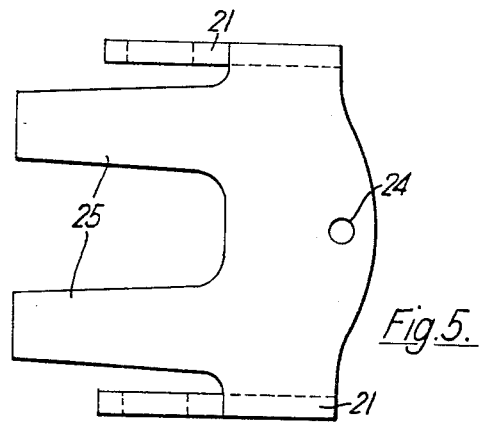
Figure 6:
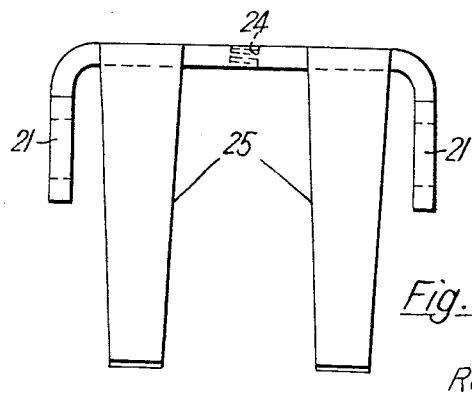

The control spring compressing attachment consists of a leaf spring 20 having attachment means in the form of a pair of lugs 21 by means of which the leaf spring is pivotally mounted on studs 22 on the rear extension 15 of the housing. A bolt 23 is screwed into an aperture 24 in one end of the spring and abuts against the housing 10, and the other end of the spring has a pair of spaced-apart portions 25 (FIGS. 5 and 6) which engage the rocker 16 and hence apply a force to the rod 14 and the control spring 11.

A nut 26 on the bolt 23 serves as adjustment means to vary the force applied to the control spring 11 by the portions 25 of the leaf spring, upward movement of the nut in FIG. 1 increasing the force and downward movement reducing the force.

The leaf spring 20, bolt 23 and adjusting nut 26 may be manufactured as an attachment to be secured to a tractor having a double-acting control spring enabling it to handle implements of greater weights than normal. Alternatively, the attachment may be used to convert a single-acting control spring to a double-acting type.

Modifications are possible. For example, the leaf spring could be of various shapes and could be bolted to the extension 15 or the housing 10 instead of pivoted to the extension. The leaf spring could also act directly on a pin carried by the rod 14, the rocker 16 being omitted. Moreover, the control spring 11 may be other than a coiled spring; it could for example be a leaf spring.

I claim:
1. In a tractor having a hydraulic power lift, a feedback control system and a control spring responsive to the feedback control, a leaf spring pivotally attached to the tractor body, one end of said leaf spring engaging the outer end of said control spring to impose a force in one direction thereon and the other end having adjustment means adapted to react between the leaf spring and a reaction point on the tractor to regulate the force imposed on said control spring by said one end of the leaf spring.
2. A leaf spring according to claim 1 in which said spring is pivotally connected to the tractor body intermediate the ends of the leaf spring, said one end of the leaf spring and said adjustment means being disposed on opposite ends of said leaf spring.
3. A leaf spring according to claim 1 in which said adjustment means is a screw-threaded member carried by the other end of said leaf spring and having a head portion adapted to react on the tractor.

References Cited

UNITED STATES PATENTS 1,854,442   4/1932   Baird _____ 262—48

FOREIGN PATENTS 719,166   4/1963   Canada.

ARTHUR L. LA POINT, *Primary Examiner.*

R. M. WOHLFARTH, *Assistant Examiner.*